United States Patent Office 3,328,142
Patented June 27, 1967

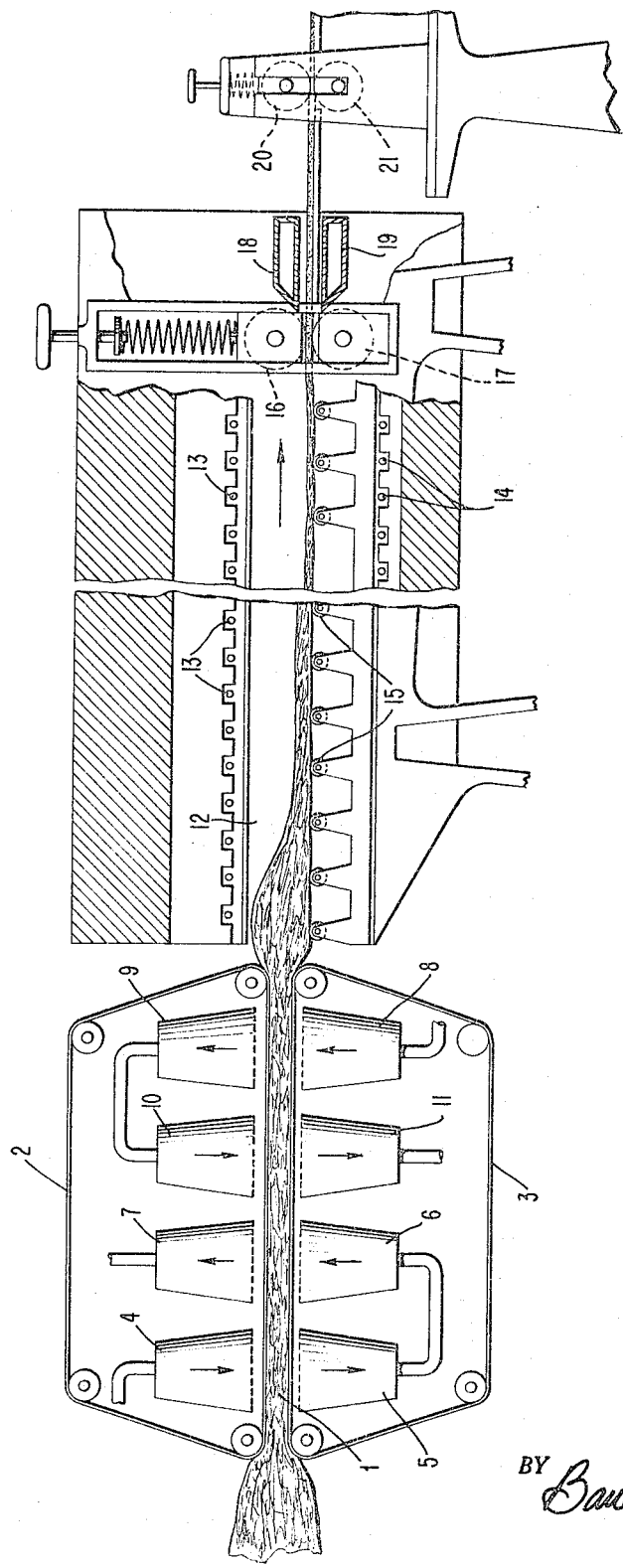

3,328,142
FORMATION OF GLASS MATS
Marcel Lévecque, Saint-Gratien, France, assignor to Compagnie de Saint-Gobain, Neuilly-sur-Seine, France
Filed July 26, 1960, Ser. No. 45,412
Claims priority, application France, Aug. 4, 1959, 801,957
7 Claims. (Cl. 65—4)

This is an improvement on the invention described and claimed in the applications identified as Levecque et al., Ser. No. 649,109, filed Mar. 28, 1957, now abandoned, Lavecque et al., Ser. No. 656,510, filed May 2, 1957 (now U.S. Patent No. 3,007, issued Nov. 7, 1961), and Levecque et al., Ser. No. 741,215, filed June 11, 1958, now abandoned of which this application is a continuation-in-part.

In accordance with the invention, a mixture of at least two different categories of fibers of the same material but different thermoplastic properties, one kind having a softening point considerably lower than the others, are collected into a mass and agglomerated. In this way the temperatures at which these fibers begin to change form may differ by a hundred degrees or more.

According to a first characteristic of the invention, one obtains fibers of the same material but with different thermoplastic properties by subjecting them to different cooling conditions as they are produced. Such differing fibers can also be produced by using different temperatures of fibering on glass of similar constitution.

The applicant has ascertained that two fibers of the same material and diameter, if produced at different fibering temperatures, or under different cooling conditions, or both, will have different thermoplastic properties. These properties can be materially differentiated by selection of the fibering temperature and/or by control of the hardening conditions used on the fibers in the course of production.

According to another characteristic of the invention, the mixture to be agglomerated is made up of a mixture of fine fibers, in general lower than 5 microns diameter, and of thicker fibers, but generally lower than 30 microns diameter.

The applicant has established that the agglomeration can be realized in particularly favorable conditions, by following the following formula of composition by size: if it is agreed to call $d$ the average diameter of those fibers whose percentage is maximum in the mixture which is to be agglomerated, the quantity of fibers whose diameter is less than $d/2$ must be equal at least to 20% of the whole, while the quantity of fibers of a greater diameter than $2d$ must be less than 10% of the whole.

This formula is as valid for values of $d$ lower than 5 microns, as for higher values, of 9 to 12 microns.

The physical properties of fibers, in particular their thermoplastic properties, vary as a function of their diameters, these variations being due to the different cooling conditions to which fibers of different diameters are naturally subjected, and which entail modifications of the physical structure of the glass.

In the course of their labors, the applicants have been able to establish that an important condition for obtaining a good agglomeration is to develop the surface of the fibers to the maximum. However, if only fine fibers are utilized, sheets, plates, or pieces are obtained, after agglomeration, which are very dense and have little or no elasticity. If both fine and thicker fibers are utilized at the same time, the applicant has observed that products of great cohesion with a certain elasticity are obtained.

The fibers can be prepared by any known process, notably by mechanical drawing out, by fluid blowing, or by centrifugation.

The fibers produced at different temperatures and under different conditions of cooling can be produced by a plurality of producing systems or by a single producing system whose working cycle has been suitably regulated.

In order to accomplish the agglomeration, the mixture of fibers is subjected to a temperature which, in general, is over 300° C., and is preferably between 400 and 700° C., the temperature used being variable according to the nature of the glass.

This heating of the glass should be carefully regulated and quite rapid. In fact, too slow heating has a tendency to stabilize the fiber, that is, to destroy the property that tempered glass fibers have of softening at a lower temperature.

Compositions of glass within the following ranges are especially suited to use in the invention:

| | Percent |
|---|---|
| $SiO_2$ | 57–64 |
| $Al_2O_3$ | 2–5 |
| $B_2O_3$ | 2–12 |
| CaO–MgO–BaO | 12–20 |
| $Na_2O$–$K_2O$ | 12–15 |
| F | 0–5 |

By way of example, one can begin with a glass having a composition corresponding to the average of compositions of the above type. With this glass a mixture of fibers is produced whose average diameter $d$ as defined above is of 6 microns. With this mixture of fibers a felt is formed whose dnesity is 12 kilog./m.$^3$ and whose thickness is 7 cm. The temperature of the sheet is brought, in less than two minutes, from atmospheric temperature to a temperature of about 600° C. The operation can be conducted without pressure or under mildly elevated air pressure, without using mechanical pressure or molding systems.

In the course of this operation, the sheet undergoes a progressive contraction in all its dimensions. This contraction is accompanied by an increase in cohesion and density, the latter being capable of increasing from 10 to 40 kg./m.$^3$, and even, in the case of very fine fibers, from 6 to 8 kg./m.$^3$ to 600 kg./m.$^3$. The density of the final product can even, in certain cases, go beyond 600 kg./m.$^3$ and attain up to 1500 kg./m.$^3$. The treatment of the felt can be accomplished in a continuous or discontinuous manner.

The operation can be followed, and this constitutes another characteristics of the invention, by a shaping process by passage between rollers or through a calendering system, this passage being effected at a temperature equal to or lower than the temperature of thermal treatment utilized for agglomeration. By changing the temperature of the rollers or calenders, the surface conditions of the sheet can also be modified and an effect be produced on the quality of the products obtained.

Before the operation of agglomeration, the fibers can be moistened by sprinkling or soaking. This moistening achieves improvement in the surface conditions and constitutes a part of the invention. It allows the density to be increased, produces a decrease in the thickness of the sheet, and reduces the contraction in the other dimensions. This moistening also permits the use of a lower temperature for the beginning of agglomeration.

The agglomerated products obtained can be utilized without the addition of any sizing. They thus have maximum proof against attack, maximum resistance to chemical reagents, and partake of the full strength of the mineral fibers of which they are composed.

In order to make composite products the sheet may be made by superposing several sheets each having different values of diameter *d*. For example, by agglomerating together two external layers having low value of *d*, for example of the size of 4 microns, with an internal layer having a *d* value of about 12 microns, pieces can be formed which, while possessing very hard outer surfaces, retain remarkable elasticity.

Threads of tissues of glass, capable of acting as strengtheners in the final product, can be introduced into the starting sheet or between two sheets. The threads are very useful when the body of the product is composed largely of short lengths of glass.

The second of the identified applications, Ser. No. 741,215, describes the methods in which the heating is carried out at a sufficient speed to avoid an elevation of the softening point of the tempered fibers, specially of the fibers which have been previously cooled more rapidly, and also the method of agglomerating glass fibers of different sizes that comprises heating them to agglomerating temperature in contact with each other in the presence of moisture.

The identified cases described glass which is particularly useful for this unique process and which has the composition above mentioned.

The foregoing specifications constitute a useful part of the present invention. It is an object of the present invention to improve the product and process, already of superior quality, which are described in the said applications. I have discovered that internal imperfection occasionally is found in some of the products made by the identified processes and that the internal imperfection can be eliminated and a superior product produced by the novel process which is one of the objects of the present invention.

The present invention refers to a process for the preparation of sheets, plates and formed pieces composed of glass fibers or analogous thermoplastic material the fibers of which are matted and connected so as to produce a coherent product according to this process, which will be described in its application to the use of glass fibers. A loose mattress of glass fibers is formed by any method of the prior art such as blowing and centrifugation but with this provision that the fibers have different thermoplastic properties or different diameters as described above. This mattress is collapsed, as above described, and its fibers are joined at their points of contact by subjecting the mattress to quick heating, to a temperature between 400 and 700° C., the temperature varying according to the characteristics of the blast. The present invention is based upon the discovery that before collapsing the mattress by heating and joining its fibers the mattress is submitted to a preheating to a temperature approaching but lower than that temperature which corresponds to the beginning of the attachment of the fibers to each other at their points of contact, a point which is called the fritting point hereinafter. For example, for mattresses having a fritting temperature of 700° C. the preheating will bring the temperature of the mat to approximately 500° C. This heating is preferably carried out in such a way that the whole mattress is brought to substantially the same temperature. A satisfactory method of heating is to blow hot air through the thickness of the mattress transversely to its length. During this heating it is advantageous to subject the mattress to confinement and light pressure without substantially increasing its density. Thereafter the hot mattress is transferred to an oven at a temperature such as described in the parent case wherein it is caused to collapse by heat while its fibers are joined at their points of contact. The sheets thus formed may be calendered and cooled or cooled without calendering. Although the improvement according to the invention is particularly advantageous in the treatment of thick mattresses, it can equally be used for the production of thin plates and sheets for example, in the production of battery separators. In effect the preheating to which the mattress is subjected gives a more economic use of heat and reduces the time of treatment in the oven.

Several methods of heating the mattress may be employed, particularly those which act on the interior as well as the exterior of the mattress, such as by induction but a preferred method is by blowing hot gas through the mattress. This novel and particularly advantageous apparatus is described as follows:

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views:

The figure is a diagrammatic view party in vertical section of an apparatus embodying the novel preheater.

The mattress 1 composed of glass fibers in loose association is received between two conveyor belts 2, 3 which engage the opposite faces of the mattress and subject it to slight pressure. These conveyor belts are driven at the same speed and are foraminous to the extent necessary to permit the flow of hot gas. Fine wire mesh or Fourdrinier wire are acceptable. On each side of the portions of the conveyor which engage the mattress are hot air hoods 4, 5, 6, 7, 8, 9, 10, 11. Any means of heating the air and forcing it through the hoods is acceptable. The hoods will approach the conveyors very closely and may be provided with appropriate means for confining the hot gas to flow through the mattress. The discharge for the hoods 7, 11 may be under vacuum. Thus the hot air which enters hood 4 at a temperature of 500° for instance passes through the thickness of loose mattress 1 into hood 5 from whence it travels through a pipe to hood 6 and through the mattress to hood 7 from whence it is discharged at any convenient locality. The group of hoods 8 to 11 is arranged inversely to the group 4 to 7 as regards flow. This apparatus produces a very uniform heat throughout the thickness of the mattress. The hot mattress is discharged by the conveyors 2, 3 into the oven 12 which has in its roof and floor electrical resistances 13, 14 which heat the oven and turn radiant heat upon the mattress. The mattress usually expands somewhat as it leaves the conveyors as it is thereafter collapsed and its fibers are joined at their points of contact by the temperature of 300 to 700° C. which is maintained in the oven. The mattress is supported on rollers 15 during its passage through the oven. The collapse is largely accomplished by the radiant heat which is turned on its faces. After passing through the oven, calender 16 may be used to further compress the hot sheet or the sheet may be passed directly to coolers 18. The speed with which the sheet is drawn from the oven is regulated by rollers 20, 21. It is usually advantageous to apply a slight tension to the sheet by means of these rollers.

An advantage of the invention is in the production of thick bodies having a density of 1 kg./m. per square meter or better. Another advantage is that the thermal treatments which are applied to the fibers throughout the thickness of the mattress differ very little from each other so that the fibers of the central part are fritted as well as the fibers at the surface. This makes a superior product, the superiority of which is particularly noticeable in the production of thick plates, sheets and the like.

As many apparently widely different embodiments of the present invention may be made without departing from the spirit and scope thereof, it is to be understood that the invention is not limited to the specific embodiments.

What is claimed is:

1. A method of making porous fibrous glass plates that comprises depositing unstabilized glass fibers which have the same composition but different thermoplastic properties by free fall in the form of a loose mattress of approximately uniform thickness containing a substantial content of fibers below 5 microns diameter and a substantial content of fibers between 5 and 30 microns diamater, the proportion of sizes of fiber being such that if $d$ be the average diameter of the fibers that are maximum in the mattress, those of diameter less than about $d/2$ will be at least 20% of the whole and those of diameter about $2d$ will not exceed about 10% of the whole, confining the mattress under slight compression, moving the mattress through oppositely directed streams of hot gas and thereby heating it throughout to a temperature of at least 300° C. and preferably at least approaching that at which the fibers begin to join at their points of contact, releasing the mattress from confinement and compression, further heating the mattress to a temperature not substantially above 700° C. by heat applied to its opposite faces, until it collapses and its fibers join at their points of contact, terminating the heating before the fibers have stabilized, and compressing and cooling the collapsed mattress.

2. Apparatus for forming plates of fibers glass that comprises double conveyor means to form a loose mattress of fibers, means to confine and slightly compress the mattress, means to blow hot gas through the mattress, and thereby to raise its temperature to a degree circa 300–500° C. at least approaching the point at which its fibers join at their points of contact, means to release the hot mattress from compression, radiant means to direct heat upon its hot surface and raise it to a degree circa 700° C. sufficient to join its fibers at their points of contact and to collapse the mattress, means to compress the collapsed mattress and means to cool the compressed product.

3. A method of making porous fibrous glass plates that comprises depositing unstabilized glass fibers which, having been produced at different fibering temperatures, have the same composition but different thermoplastic properties by free fall in the form of a loose mattress of approximately uniform thickness, confining the mattress under slight compression, moving the mattress through oppositely directed streams of hot gas and thereby heating it throughout to a temperature of at least 300° C. and preferably at least approaching that at which the fibers begin to join at their points of contact, releasing the mattress from confinement and compression, further heating the mattress to a temperature not substantially above 700° C. by heat applied to its opposite faces, until it collapses and its fibers join at their points of contact, terminating the heating before the fibers have stabilized, and compressing and cooling the collapsed mattress.

4. A method of making porous plates of glass fibers which comprises forming by free fall a loose mattress of glass fibers having the same composition, different thermoplastic properties, and mixed diameters of fine fibers generally lower than 5 microns in diameter and thicker fibers generally lower than 30 microns in diameter, the mixture being such that if $d$ be the average diameter of fibers whose percentage is a maximum in the mattress the quantity of fibers of diameter less than about $d/2$ is at least about 20% of the whole and the quantity of fibers whose diameter is above about $2d$ is less than about 10% of the whole, preheating the mattress throughout by hot gas to a temperature equivalent to 500° C. for a fritting point of 700° C. in less than about 2 minutes while subjecting the mattress to confinement and light pressure, freeing the mattress from the pressure and confinement, heating the mattress by radiation to its fritting point until it collapses and its fibers join at their points of contact, and cooling the mattress, the entire heat treatment being carried out and concluded at a speed which does not stabilize the fiber.

5. A method of making porous plates of glass fibers which comprises forming a loose mattress of glass fibers having the same composition, different thermoplastic properties, and mixed diameters of fine fibers generally lower than 5 microns in diameter and thicker fibers generally lower than 30 microns in diameter, the mixture being such that if $d$ be the average diameter of fibers whose percentage is a maximum in the mattress the quantity of fibers of diameter less than about $d/2$ is at least about 20% of the whole and the quantity of fibers whose diameter is above about $2d$ is less than about 10% of the whole, preheating the mattress rapidly throughout by hot gas to a temperature approaching but substantially less than the fritting point of the fibers while subjecting the mattress to confinement and light pressure, freeing the mattress from the pressure and confinement, heating the mattress by radiation to its fritting point until it collapses and its fibers join at their points of contact, and cooling the mattress, the entire heat treatment being carried out and concluded at a speed which does not stabilize the fiber.

6. A method of making porous plates of glass fibers which comprises forming a loose mattress of glass fibers having the same composition, different thermoplastic properties, and mixed diameters of fine fibers generally lower than 5 microns in diameter and thicker fibers generally lower than 30 microns in diameter, the percentage of the said fine fibers exceeding the percentage of the said thicker fibers and the total of both in the plate being minor, rapidly preheating the mattress throughout by hot gas to a temperature approaching but substantially below the fritting point of the fibers, removing the mattress from the hot gas and immediately heating the mattress by radiation to its fritting point until it collapses and its fibers join at their points of contact, and cooling the mattress, the preheating being to about 600° C. and being carried out within a few minutes, and the duration of preheating and the intensity of heating by radiation being less than is required to stabilize the fiber.

7. A process of making porous plates of glass fibers which comprises forming a mattress of glass fibers of the same composition and different thermoplastic properties, first heating the mattress by hot gas to a temperature adjacent to but below the temperature at which stabilization begins, terminating the heating by gas, immediately heating the hot mattress by radiation to its collapse and welding point whereby to form the plate and weld the fibers at points of contacts, and cooling the collapsed plate before the fibers are stabilized.

References Cited

UNITED STATES PATENTS

| | | | |
|---|---|---|---|
| 2,016,401 | 10/1935 | Thomas | 65—4 |
| 2,328,714 | 9/1943 | Drill et al. | 65—6 |
| 2,344,601 | 3/1944 | Collins | 65—4 |
| 2,565,941 | 8/1951 | Barnard. | |
| 2,751,962 | 6/1956 | Drummond | 18—47.3 |
| 2,958,919 | 11/1960 | Palmer | 65—9 X |

DONALL H. SYLVESTER, *Primary Examiner.*

CHARLES R. HODGES, WILLIAM B. KNIGHT,
*Examiners.*

P. ISAKOV, P. GOLDSTEIN, D. CRUPAIN, C. VAN HORN, R. L. LINDSAY, *Assistant Examiners.*